United States Patent [19]

Weeks

[11] 4,221,470
[45] Sep. 9, 1980

[54] HIGH PRESSURE SIGHTGLASS FOR FLUID FLOW TUBE

[75] Inventor: Harold E. Weeks, Seattle, Wash.

[73] Assignee: The Boeing Company, Seattle, Wash.

[21] Appl. No.: 974,358

[22] Filed: Dec. 29, 1978

[51] Int. Cl.$^2$ .............................................. G02B 5/00
[52] U.S. Cl. .................................. 350/319; 350/190; 73/323
[58] Field of Search ............... 350/319, 190; 356/440, 356/441, 442, 246, 28.5; 73/323, 327–331; 116/276

[56] References Cited

U.S. PATENT DOCUMENTS

| | | | |
|---|---|---|---|
| 2,550,685 | 5/1951 | Garutso | 350/197 |
| 3,560,091 | 2/1971 | Valkenburg et al. | 356/246 |
| 3,728,032 | 4/1973 | Noll | 356/246 |
| 4,006,990 | 2/1977 | Munk | 356/440 |

Primary Examiner—Jon W. Henry
Attorney, Agent, or Firm—Christensen, O'Connor, Johnson & Kindness

[57] ABSTRACT

Disclosed is a sightglass assembly of particular application for use with a laser flowmeter to measure flow velocities of high pressure fluid flowing through a tube. A short, thick-walled glass tube having spherically rounded ends is coaxially interposed in a fluid flow system such that a continuous cylindrical fluid flow passage is provided through the bore of the sightglass tube. The sightglass tube is longitudinally clamped between a pair of endpieces having fluid flow bores. Spherical receiving surfaces in the endpieces are mated with the spherical ends of the sightglass tube to seal the joints between the sightglass and the endpieces and to pre-stress the sightglass tube with radially inward stress components enabling it to withstand higher internal fluid pressures. A pair of flat viewports on opposite sides of the sightglass tube provide windows for passage of laser light through the fluid medium in a direction transverse to the direction of flow.

15 Claims, 3 Drawing Figures

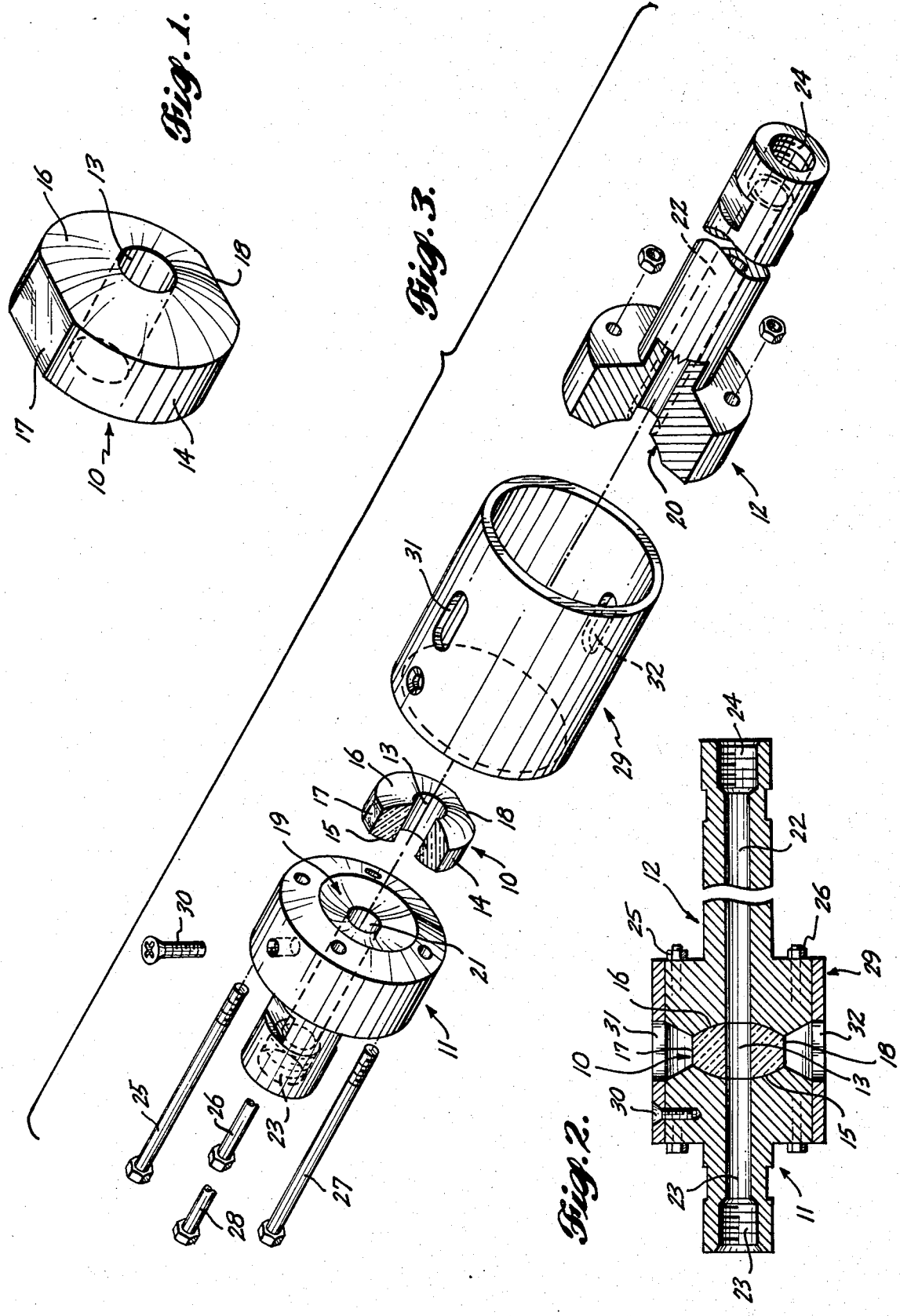

HIGH PRESSURE SIGHTGLASS FOR FLUID FLOW TUBE

BACKGROUND OF THE INVENTION

This invention relates generally to sightglass assemblies and, more particularly, to a sightglass assembly for use in connection with a laser flowmeter.

The advent in recent years of laser Doppler flowmeters for studying fluid flow dynamics has created a need for sightglass assemblies having certain performance characteristics required for use with laser flowmeters. In a laser Doppler flowmeter, two laser light beams are passed through a fluid medium at a slight angle with respect to one another such that the beams intersect at a point within the fluid medium. Upon passing through the fluid medium, interference effects between the two intersecting coherent laser beams are detected and measured by a receiving photodetector optics system.

The determination of the fluid flow rate from the interference effects between the laser beams is based upon the principle of the Doppler shift. Particles within the fluid scatter the laser light and cause a small shift in its frequency as observed from the receiving optics system. This shift in frequency is generally proportional to the velocity of the particles and thus can be measured and used to determine the velocity of particles in the fluid. From the particle velocity, the fluid velocity may be inferred. In practice, it is found that most liquids, for example, conventional hydraulic fluids, have sufficient concentrations of naturally occurring fine-grained particulate matter for this purpose. A small amount of particulate matter may be seeded into fluids which do not contain a sufficient naturally occurring concentration of particulate matter.

Laser flowmeters offer significant advantages over other types of flowmeters. Most importantly, laser flowmeters can detect more rapid changes in flow speed than can be detected with conventional flowmeter devices. Fluctuations in flow velocities can be detected at frequencies up to 50,000 cycles per second with a laser flowmeter. Also, the laser flowmeter does not require a probe or other device to be inserted into the flow stream, so problems due to turbulence generated by conventional flowmeter probes inserted in the flow stream are eliminated. Furthermore, laser flowmeters are more accurate than conventional flowmeters both at very high and very low flow velocities.

The use of a laser flowmeter requires a pair of optically transparent windows on opposites sides of the fluid medium to be studied. Each window will necessarily have its inner surface in contact with the fluid medium. The outer surface of the two windows will normally be flat and parallel to one another to avoid unwanted refraction effects. When fluids at elevated pressures are to be studied, high pressure sightglasses must be employed.

Where high pressure fluid flow within a tube is to be studied, it is necessary that the interior surface of each sightglass be flush with the interior wall surface of the tube. This is to avoid problems due to turbulence generated in the fluid as it passes the sightglass by an irregular juncture between the interior wall of the tube and the interior surface of the sightglass. At the same time, it is also a particular requirement of a laser flowmeter that the interior surfaces of the sightglasses be highly polished and free of scratches. In practice, it has heretofore been found quite difficult, if not impossible, to meet both of these requirements. Traditional single-walled sightglasses designed to withstand high fluid pressures have been typically constructed of thickwalled glass having a conically beveled edge. Such a traditional sightglass is seated in a wall port having a matching conically beveled inside edge so as to obtain a self-sealing effect from the pressurized fluid behind the wide portion of the sightglass. An elastomeric sealant is normally applied between the edges of the sightglass and the wall port to prevent fluid leakage and to prevent uneven stresses from developing within the sightglass. In practice, it has been found extremely difficult to construct a sightglass having a highly polished interior surface which, upon being installed and seated with a sealant in a matching wall port, provides an essentially flush juncture between the interior surface of the sightglass and the adjacent interior wall surface. To obtain a flush juncture it has normally been found necessary to grind the interior surface of the sightglass flush with the interior wall surface after the sightglass has been installed. This, however, inevitably introduces scratches in the sightglass surface due to metal particles abraded from the wall surface. When the glass surface is scratched, a portion of the laser beam is scattered by the sightglass surface and performance of the laser flowmeter is thereby impaired.

Accordingly, it is a general object of the present invention to provide a sightglass assembly for observation of high pressure fluid in a hydraulic line or other flow tube.

It is a further object of the present invention to provide a high pressure sightglass assembly for use in connection with a laser flowmeter.

It is also an object of the present invention to provide a prepolished high pressure sightglass assembly which may be installed with its interior surface being flush with the interior surface of a fluid flow tube without any necessity of post-installation polishing.

It is another object of the present invention to provide a high pressure sightglass assembly which can be installed in a fluid flow tube and which does not generate tubulence in fluid flowing past it.

SUMMARY OF THE INVENTION

The present invention consists of a high pressure sightglass assembly for a fluid flow tube. In the preferred embodiment, a sightglass has the configuration of a short, thick-walled glass tube. A central bore through the sightglass tube provides a passage for fluid flow. The sightglass tube is clamped longitudinally between two endpieces having cylindrical bores aligned with the bore of the sightglass tube. The sightglass assembly, including the sightglass tube and the two endpieces, may be installed in-line with a hydraulic line or other fluid flow system to provide a continuous cylindrical fluid flow passage through the sightglass tube. In a preferred embodiment, fluid flowing through the sightglass tube may be viewed from the side by means of a pair of flat viewport surfaces on opposite sides of the outer glass surface of the sightglass tube. More particularly, the viewport surfaces on opposite sides of the sightglass tube may be used for passing a pair of laser light beams through the fluid medium in a direction generally transverse to the direction of fluid flow.

The rounded ends and the short, thick-walled configuration of the sightglass tube give it the general appearance of a glass lens having a bore through its center. In the preferred embodiment, the ends of the sightglass tube are spherically rounded and converge toward the outer tube surface of the sightglass tube. The outer wall surface is generally cylindrical except for the two flat viewport surfaces which truncate the cylindrical surface on opposite sides of the sightglass tube. The axial length of the outer tube surface is made as small as is necessary to accommodate the viewport surfaces. To best enable the sightglass tube to withstand high internal fluid pressures, the tube is made with a wall thickness approximately equal to the diameter of the sightglass bore.

In order to circumvent internal loading limitations on the glass, a material that will withstand much higher compressive loading than it will tension loading, the sightglass tube is clamped between the endpieces by means of nut and bolt assemblies which connect the two endpieces and are circumferentially spaced around the sightglass tube. The nut and bolt assemblies are tightened to a predetermined tensile load to apply a uniform compressional load to the sightglass tube preferably such that the glass remains loaded in compression under even the highest internal fluid pressures in the tube. The spherical end surfaces of the sightglass tube convert the endwise compressive loading into radially inward compressive preloading of the sightglass tube in order to further withstand the highest internal fluid pressures. With appropriate preloading, a sightglass tube having a bore diameter of approximately 0.44 inches and a wall thickness of approximately 0.53 inches can be made capable of withstanding internal fluid pressures of at least 7,500 pounds per square inch. A layer of elastomeric sealing material (preferably "Teflon"-polytetrafluoroethylene) is emplaced between the sightglass end surfaces and the endpieces in order to seal the junctures against fluid leakage and, more importantly, to assure even distribution of force applied to the sightglass by the recessed endpiece surfaces.

The interior surface of the sightglass bore can be highly prepolished prior to fabrication of the sightglass assembly. The size and alignment of the sightglass bore thus mounted may also be precisely matched with the size and alignment of the endpiece bores prior to assembly. Consequently, a highly polished, continuous fluid flow passage is provided through the sightglass tube and endpieces. The resulting sightglass assembly is more particularly suited to laser Doppler flow measurement than sightglass assemblies heretofore available.

BRIEF DESCRIPTION OF THE DRAWINGS

FIG. 1 is an isometric view of the sightglass tube.
FIG. 2 is a longitudinal sectional view of the sightglass assembly.
FIG. 3 is an exploded isometric view of the sightglass assembly.

DETAILED DESCRIPTION OF THE PREFERRED EMBODIMENT

Referring to FIGS. 1 through 3, a preferred embodiment of the sightglass assembly consists generally of a sightglass tube 10 which is clamped between two endpieces 11 and 12 in such a manner as to provide a continuous cylindrical fluid flow passage through the endpieces 11 and 12 and the sightglass tube 10.

The sightglass tube 10 consists of a short, thick-walled glass tube having a central cylindrical bore 13 which passes entirely through the sightglass tube 10 along its central longitudinal axis. The sightglass tube 10 has an outer cylindrical surface 14 and spherically curved end surfaces 15 and 16. The outer cylindrical surface 14 is truncated on opposite sides by flat viewport surfaces 17 and 18 which are parallel to one another and which are positioned on opposite sides of the sightglass tube 10 from one another.

The endpieces 11 and 12 include spherically configured concave receiving surfaces 19 and 20. Cylindrical endpiece bores 21 and 22 pass longitudinally through the endpieces 11 and 12 and open onto the centers of receiving surfaces 19 and 20. The axes of the endpiece bores 21 and 22 are radially aligned with the spherical receiving surfaces 19 and 20. The endpiece bores 21 and 22 may be connected to hydraulic lines or other fluid flow systems by means of threaded joints 23 and 24.

The spherical receiving surfaces 19 and 20 are configured so as to cooperably mate with the spherical end surfaces 15 and 16, respectively, of the sightglass tube 10 to form a close-fitting joint between the sightglass tube 10 and the end pieces 11 and 12. A thin layer of an elastically deformable sealing material, for example, polytetraflouroethylene may be applied to the receiving surfaces 19 and 20 in order to provide a more fluid-impermeable seal and also to more evenly distribute the compressional stress on the sightglass tube 10.

In the preferred embodiment, the sightglass tube 10 is clamped between the end pieces 11 and 12 by means of four nut and bolt assemblies 25,26,27 and 28 which connect the two endpieces 11 and 12. The nut and bolt assemblies 25,26,27 and 28 are radially spaced from the sightglass tube 10 and are circumferentially spaced from one another around the sightglass tube 10. During fabrication of the sightglass assembly, the nut and bolt assemblies 25,26,27 and 28 are tightened to a predetermined tensile load in order to preload the sightglass tube 10 to withstand high internal fluid pressures. With appropriate tightening of the nut and bolt assemblies 25,26,27 and 28, the sightglass tube 10 having a wall thickness of 0.528 inches and a bore diameter of 0.444 inches, can be made to withstand internal fluid pressures of at least 7,500 pounds per square inch.

A protective casing 29 is positioned around the endpieces 11 and 12 and sightglass tube 10 to protect the assembly from inadvertent damage or misalignment. The protective casing 29 is secured with a set screw 30 and is provided with a pair of viewports 31 and 32 aligned with the viewport surfaces 17 and 18 of the sightglass tube 10.

It will be seen that the interior cylindrical surface of the sightglass bore 13 can be highly polished prior to fabrication of the sightglass assembly and yet can also be accurately aligned with the endpiece bores 21 and 22 during fabrication. No grinding or polishing of the bores 12, 31 and 22 is necessary during or after fabrication to perfect their alignment, so there is no danger of scratching the interior bore 13 of the sightglass tube 10.

The embodiments of the invention in which an exclusive property or privilege is claimed are defined as follows:

1. A sightglass for use in a sightglass assembly for a fluid flow tube comprising a substantially transparent sightglass tube having a substantially centered axial cylindrical sightglass bore passing therethrough, said sightglass tube having an outer tube surface and opposite tube end surfaces, each of said end surfaces being spherically configured, said outer tube surface including two substantially parallel flat viewport surface areas positioned on respectively opposite sides of said sightglass tube.

2. The sightglass defined in claim 1 wherein said outer tube surface is substantially cylindrical and truncated by said viewpoint surfaces.

3. The sightglass defined in claim 2 wherein said sightglass tube has a wall thickness substantially over the length of said outer tube surface at least as great as the diameter of said sightglass bore.

4. The sightglass defined in claim 3 wherein said bore of said sightglass tube has a length not greater than substantially twice its diameter, and wherein said substantially cylindrical outer tube surface has an axial length substantially equal to the diameter of said bore.

5. A sightglass assembly for a fluid flow tube comprising:
   a substantially transparent sightglass tube having a substantially centered axial cylindrical sightglass bore passing therethrough, said sightglass tube having an outer tube surface and opposite tube end surfaces, each of said end surfaces being tapered, said outer tube surface having an area adapted optically for viewing said bore through the wall of said sightglass tube;
   two sightglass assembly endpieces, each endpiece having an axial endpiece fluid flow bore of a diameter substantially equal to the diameter of said sightglass bore, each endpiece having a recessed sightglass end receiving surface in which the endpiece fluid flow bore is centered, said receiving surfaces of said endpieces being conformed to the respective tapered sightglass tube end surfaces for mated compressional fitting of said sightglass tube between said end pieces in coaxial alignment; and,
   means for fixedly clamping said sightglass tube in axial compression between said endpieces with said end piece bores coaxially aligned with said sightglass tube bore, and with said tapered tube end surfaces cooperably abutting against said receiving surfaces of said endpieces, thereby converting a portion of the axial compressional stress in said tube into radially inwardly directed precompression thereof.

6. The sightglass assembly defined in claim 5 wherein said tapered tube end surfaces and said recessed endpiece receiving surfaces are spherically configured.

7. The sightglass assembly of claim 6 wherein said outer tube surface includes two substantially parallel flat viewport surface areas positioned opposite one another on said outer tube surface.

8. The sightglass assembly of claim 7 wherein said outer tube surface is substantially cylindrical and truncated by said viewport surfaces.

9. The sightglass assembly of claim 8 wherein said sightglass tube has a wall thickness substantially over the length of said outer tube surface at least as great as the diameter of said sightglass bore.

10. The sightglass assembly of claim 9 wherein said bore of said sightglass tube has a length not greater than substantially twice its diameter.

11. The sightglass assembly of claim 10 wherein said substantially cylindrical outer tube surface has an axial length substantially equal to the diameter of said sightglass bore.

12. The sightglass assembly of claim 11 further comprising an elastically deformable sealing means interposed between said tube end surfaces and said endpiece receiving surfaces for providing a fluid-impermeable seal and for more uniformly converting said axial compressional stress in said tube into radially inwardly directed precompression thereof.

13. The sightglass assembly of claim 12 wherein said elastically deformable sealing means is polytetraflouroethylene.

14. The sightglass assembly of claim 13 further comprising a removable protective casing positioned around said endpieces and said sightglass tube, said protective casing having two viewports alignable with said viewport surfaces of said sightglass tube.

15. The sightglass assembly of claim 14 wherein said means for clamping said sightglass tube between said endpieces comprises a plurality of bolt means connecting said endpieces to one another, said bolt means being aligned parallel to one another and to the longitudinal axes of said sightglass bore and said endpiece bores, said bolt means being radially spaced from said sightglass tube and circumferentially spaced from one another around said sightglass tube, said bolt means bearing upon said endpieces with a uniform predetermined tensile load.

* * * * *